(12) United States Patent
Suarez et al.

(10) Patent No.: US 10,838,641 B2
(45) Date of Patent: Nov. 17, 2020

(54) DEFRAGMENTING BACKUP OBJECTS

(71) Applicant: INTERNATIONAL BUSINESS MACHINES CORPORATION, Armonk, NY (US)

(72) Inventors: Jeffrey R. Suarez, Tucson, AZ (US); Jason R. Luurs, Tucson, AZ (US); Dave Bach, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/291,770

(22) Filed: Mar. 4, 2019

(65) Prior Publication Data
US 2020/0285389 A1 Sep. 10, 2020

(51) Int. Cl.
G06F 3/06 (2006.01)
(52) U.S. Cl.
CPC .............. *G06F 3/064* (2013.01); *G06F 3/065* (2013.01); *G06F 3/067* (2013.01); *G06F 3/0619* (2013.01); *G06F 3/0644* (2013.01)

(58) Field of Classification Search
CPC ....................................................... G06F 3/064
See application file for complete search history.

(56) References Cited

U.S. PATENT DOCUMENTS

| | | | |
|---|---|---|---|
| 9,183,243 B2 | 11/2015 | Gensler, Jr. et al. | |
| 9,372,643 B2 | 6/2016 | Dudgeon et al. | |
| 2004/0003314 A1* | 1/2004 | Witt | G11B 27/11 |
| | | | 714/6.12 |
| 2016/0364166 A1 | 12/2016 | Dudgeon et al. | |

* cited by examiner

*Primary Examiner* — Edward J Dudek, Jr.
(74) *Attorney, Agent, or Firm* — David W. Victor; Konrad Raynes Davda & Victor LLP

(57) ABSTRACT

Provided are a computer program product, system, and method for defragmenting backup objects. A metadata object having first format addresses for data sets in data objects for a volume is copied to a temporary metadata object. The data sets in the data objects are copied to consecutive second format addresses in temporary data objects to defragment data in the data sets in the data objects. The first format and the second format addresses comprise different address formats. The temporary metadata object and the temporary data objects are stored in the storage to provide a backup of the volume.

20 Claims, 5 Drawing Sheets

DEFRAGMENTING BACKUP OBJECTS

BACKGROUND OF THE INVENTION

1. Field of the Invention

The present invention relates to a computer program product, system, and method for defragmenting backup objects.

2. Description of the Related Art

Cloud storage services provide access to network based storage to allow subscribers to backup and access data objects in a network storage over a network, such as the Internet. Customers may store backup volume objects to backup volumes using a track format address scheme, such as cylinder and track numbers, that appears as unstructured data when stored in a network cloud storage.

There is a need in the art for improved techniques for storing volume backup and in network storage as well as local storage.

SUMMARY

Provided are a computer program product, system, and method for defragmenting backup objects. A metadata object having first format addresses for data sets in data objects for a volume is copied to a temporary metadata object. The data sets in the data objects are copied to consecutive second format addresses in temporary data objects to defragment data in the data sets in the data objects. The first format and the second format addresses comprise different address formats. The temporary metadata object and the temporary data objects are stored in the storage to provide a backup of the volume.

DETAILED DESCRIPTION

Volume backup objects generated to backup a volume may include substantial amounts of unallocated space. When the volume objects are transmitted to a network storage, such as cloud storage, the volume backup objects may consume far more space than needed to store the data in the volume data set extents. Further, if a volume is substantially fragmented, then the volume may need to be defragmented when recovered at the client or host system, which may delay making the recovered volume available for use and require use of client processing resources to defragment the recovered volume to create larger free space extents.

Described embodiments provide improvements to computer technology for defragmenting volume backup objects for storage that use a track addressing format that differs from the storage address format in which the volume backup objects are defragmented. Described embodiments copy data sets in data objects for the volume backup objects to temporary data objects at consecutive storage addresses, such as relative byte addresses or logical block addresses in computer storage, to relocate the data objects. The storage addresses and the volume addresses may be in different address formats. For instance, the volume addresses, also referred to herein as first format addresses, may be in a track address format and the storage addresses, also referred to herein as second format addresses, may be in a relative byte address, logical block address or block addressable format. To accommodate that the defragmented data is written to a storage address that does not map to the volume address in the volume table for the defragmented data, a determination is made of a new volume address, in a track address format, mapping to a storage address of data in a data set in the temporary data object.

With described embodiments, the temporary volume table, such as a volume table of contents (VTOC), is updated to include the new volume address for the data in the temporary data object to reflect that the data for a data set has been moved from a fragmented/non-consecutive track location to a consecutive storage address in a storage or memory device in which the data object is being defragmented. The volume data sets may then be stored in the data objects without fragmentation, with the volume addresses, in track format, updated for extents of tracks moved to consecutive storage locations to remove gaps of unallocated space in the layout.

Figure 1:
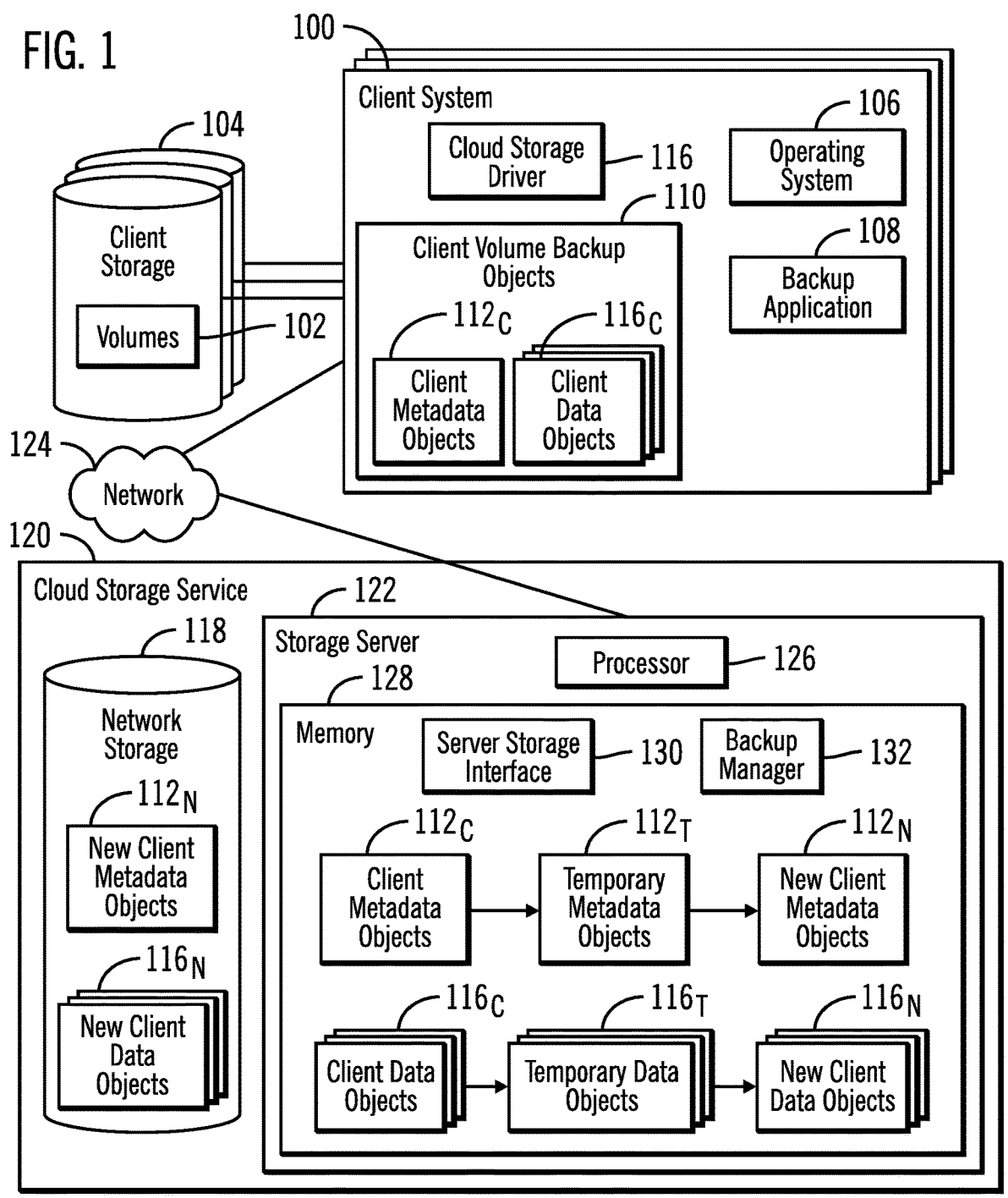
FIG. 1 illustrates an embodiment of a network storage environment.

FIG. 1 illustrates an embodiment of a network storage environment comprising client systems 100, also referred to as a client system and client, that may store volumes 102 in a client storage 104. The client system 100 includes an operating system 106, which manages computer hardware and software resources and provides common services and a file system for the storage 104, and a backup application 108 to generate client volume backup objects 110 to backup a volume 102, including one or more client metadata objects 112 having volume metadata 200 and client data objects 114 storing extents, such as ranges of tracks, of data in data sets of a volume 102. The backup application 108 may invoke a cloud storage driver 116, which may be supplied by a cloud storage service provider, to read and write the volume backup objects 110 to a network storage 118 managed by a cloud storage service 120 maintained by a cloud storage provider.

The cloud storage service 120 maintains a storage server 122 that manages access to the network storage 118 over a network 124. The cloud storage service 120 provides cloud storage services to allow participating clients that subscribe to the storage services offered by the cloud storage service 120 to store and archive volume backup objects 110 over the network 124 at the network storage 118.

The storage server 122 includes a processor 126, such as a processor complex of one more processors and processor cores, and a memory 128 including a server storage interface 130 and backup manager 132. The server storage interface 130 processes access requests with respect to received volume backup objects 110 to store in containers configured in the network storage 118 for subscribers to the cloud storage service 120. The backup manager 132 may defragment data in the client data objects $116_C$, received from the clients 100, before storing in the network storage 118 by generating temporary metadata objects $112_T$ from the received client metadata objects $112_C$ and by generating temporary data objects $116_T$ from the received client data set objects $116_C$. The extents of data in the client data set objects $116_C$ are defragmented by storing the extents in the data sets at consecutive byte addresses in the temporary data objects $116_T$ in the memory 128 without gaps of unused space. The temporary metadata objects $112_T$ and the temporary data objects $116_T$ may be renamed to the original names of the client metadata objects $112_C$ and data objects $116_C$ to produce new client metadata objects $112_N$ and new client data objects $116_N$ having the movable data, such as extents of data sets, defragmented to store the defragmented objects $112_N$ and $116_N$ in the network storage 118. Examples of cloud storage services 120 that may utilize the backup manager 132 to defragment client backup objects include cloud storage service providers, such as DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The client storage 104 and the network storage 118 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAIVI), magnetic hard disk drive, optical disk, tape, etc. The storage devices in one storage tier maybe organized as a Redundant Array of Independent Disks (RAID) array, a Just of Bunch of Disks (JBOD) array, and other arrangements.

The network 124 may comprise a network such as a Storage Area Network (SAN), Local Area Network (LAN), Intranet, the Internet, Wide Area Network (WAN), peer-to-peer network, wireless network, arbitrated loop network, etc. In one embodiment, the storage server 122 may implement a cloud computing environment in the network 124 that provides storage services to clients 100 that subscribe to the cloud storage service 120.

The memory 128 may comprise one or more instances of suitable volatile and/or non-volatile memory devices to buffer data and applications being processed by the processor 126, such as a main memory for the processor 126.

Although a certain number of instances of elements, such as clients 100, storage servers 122, cloud storage service 120, and storages 104 and 118, etc., are shown, there may be any number of these elements. The arrows shown in the memory 128 show a flow of data as it is being transformed and not structures in the memory 128.

Figure 2:
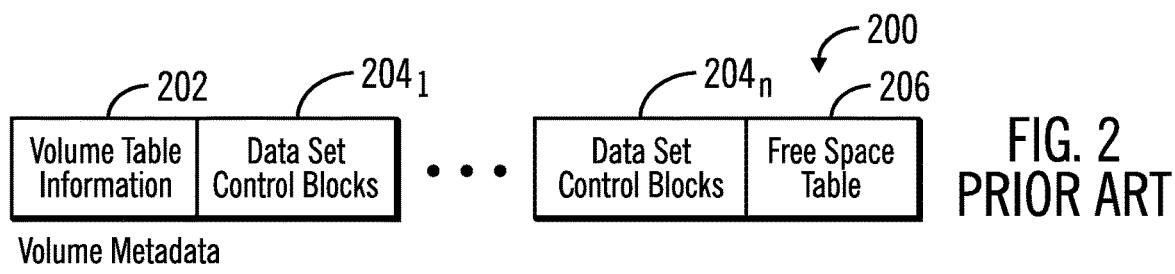
FIG. 2 illustrates an embodiment of volume metadata as known in the prior art.

FIG. 2 illustrates an embodiment of the volume metadata 200, as known in the prior art, maintained in the metadata objects 112, and includes volume table information 202, such as the volume serial number, etc. followed by one or more data set control blocks $204_1 \ldots 204_n$ having information on data sets in the volume 202, including track addresses of extents of the data sets in storage, where track addresses may be in a cylinder-head-sector track address format. The volume metadata 200 further includes a free space table 206 indicating track addresses of free space that may be allocated to extents. An extent comprises a range of data at track addresses. The backup manager 132 generates the temporary metadata objects $112_T$ and data objects $116_T$ at byte addresses in the memory 128, which may comprise a byte addressable memory. In an alternative embodiment, the memory 128 may use different addressing formats such as a block addressable memory.

Figure 3:
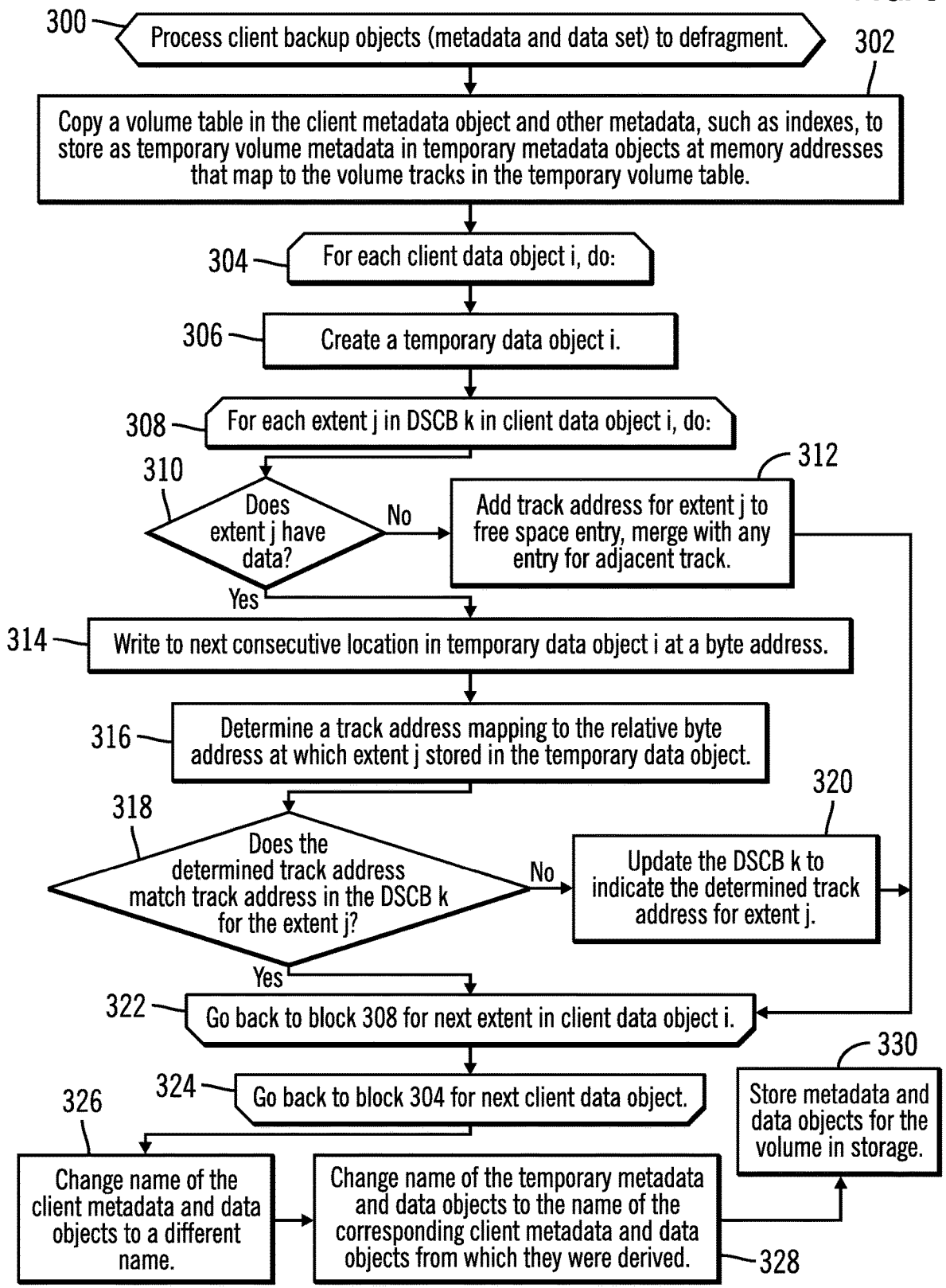
FIG. 3 illustrates an embodiment of operations to defragment volume backup objects.

FIG. 3 illustrates an embodiment of operations performed by the backup manager 132 to defragment the client volume objects $112_C$ and $116_C$ to store in the network storage 118. Upon processing (at block 300) the client backup objects $112_C$ and $116_C$ to defragment, the backup manager 132 copies (at block 302) a volume table 200, such as a volume table of contents (VTOC), in the client metadata object $112_C$ and other metadata, such as indexes, to store as a temporary volume metadata 200 in one or more temporary metadata objects at storage addresses that map to the volume tracks in the temporary volume. In one embodiment, the volume metadata 200 may be copied to the same relative locations in the temporary metadata objects $112_T$ as in the original client metadata objects $112_C$. A loop of operations is performed at blocks 304 through 322 for each client data object $116_C$ having the data sets and data set extents. At block 306 a temporary data object $116_{Ti}$ is created for a corresponding client data object $116_{Ci}$. A loop of operations is then performed at blocks 308 through 324 for each extent j in a data set control block (DSCB) $204k$. Each client data object $116_C$ may include extents for one data set or multiple data sets in the volume. If (at block 310) extent j has no data, then the track addresses for extent j indicated in the DSCB $204k$ mapping to the empty extent are added (at block 312) to an entry in the free space table 206. The empty extent track address range may be appended to an entry in the free space table 206 for an adjacent track address.

If (at block 310) the extent j does have data, then the backup manager 132 writes (at block 314) to a next consecutive location in the temporary data object $116_{Ti}$ at a byte or block address in the memory 128 in which the temporary data object $116_{Ti}$ is stored. A determination is made (at block 316) of a track address mapping to the relative byte address at which extent j is stored in the temporary data object $116_{Ti}$ In one embodiment, a function or macro may be called to convert a relative byte address of data in the memory 128 to a track address, in a track address format, such as an absolute track address, such as the cylinder, track number, and record (CCHHR) format. If (at block 318) the determined track address does not match the track address in the DSCB $204_k$ for extent j, then the DSCB $204_k$ track address information is updated to indicate the determined track address for extent j. In this way, if the defragmenting of data by writing extents to consecutive address changes the layout of where the extent is stored in the volume tracks, then the volume table data set information, e.g., DSCB $204_k$, is updated for the new track address mapping to the byte address to which the extent is written. If the extent j track address range is added to the free space table 206 (from block 312) or after updating the DSCB $204_k$ with the new track address (from block 320) of if the corresponding track address of the extent in the temporary data object $116_{Ti}$ has not changed (from yes branch of block 318), then control proceeds (at block 322) back to block 308 to process the next extent in a data set in the client data object $116_{Ci}$ if there are further extents to process. After processing all the extents in a client data object $116_{Ci}$, then control proceeds (at block 324) back to block 304 to process a next client data object $116_C$ if there are further to process.

After defragmenting all the client data objects $116_C$ to the temporary data objects $116_T$, the backup manager 132 changes (at block 326) the name of the client metadata $112_C$ and data objects $116_C$ to a different name. The names of the temporary metadata $112_T$ and data $116_T$ objects are changed (at block 328 to the original names of the corresponding client metadata $112_C$ and data $116_C$ objects from which the temporary. The new metadata $112_N$ and data $116_N$ objects are then stored (at block 330) in the network storage 118 for the volume. The original client objects $112_C$ and $116_C$ may be deleted.

In an alternative embodiment, the temporary data objects $116_T$ may be renamed before processing a next client data object $116_C$.

With the described embodiments, volume objects may be defragmented by writing extents of data to consecutive locations, such as storage addresses, and returning the track address for extents having no data to a free space table to remove gaps of empty space in the volume objects. In this way, network storage space 118 is conserved by defragmenting the volumes, which reduces the amount of space required to store the volume backup objects $112_C$, $116_C$. Further, for network cloud storage services, defragmenting the volume objects minimizes the amount of network storage space used by a client, which may also reduce the client costs to save the volume objects in a cloud storage service. Further, performing defragmenting at the cloud network storage manager allows a recovered volume to be immediately available after recovery without delays from having to defragment the volume and without using client processing resources.

In described embodiments, when the defragmented volume backup objects $112_N$, $116_N$ are restored to the client system 100, the extents in the data sets would be written to the consecutive track addresses in the client storage 104 that map to the consecutive relative byte addresses in the temporary data object $116_T$ used during defragmentation, such that the defragmented extents are now in consecutive track addresses at the client system 100.

In an alternative embodiment, when defragmenting the data object $116_C$, the backup manager 132 may not update the data set control blocks $204_i$ to indicate a determined track address that maps to the relative byte address in the temporary data object $116_T$, such as at blocks 316, 318, and 320 in FIG. 3, and instead maintain the original track address in the original client metadata objects $112_C$ for the extents in the data object $116_T$ now stored at consecutive locations. In this way, by keeping the original track addresses in the client metadata objects $112_N$, when restoring the data objects to the client system 100, the extents in the client data objects $116_N$ are restored to the original track addresses in the client metadata objects $112_C$, to cause the extents in the data objects $116_N$ to be restored to non-consecutive track addresses or restored fragmented to the original track layout when the original layout was non-consecutive and fragmented. In such embodiments, the extents in the data objects $116_N$ are stored at consecutive locations in the cloud storage service 120 to conserve space in the storage server 122 and to conserve network bandwidth when transmitting the client data objects $116_N$ back to the client system 100 over the network 124. However, the extents are restored to their original non-consecutive and defragmented track address locations in the client storage 104 if that is the user preference.

In described embodiments, the backup manager 132 performs defragmentation operations in a network cloud service server to defragment volume backup objects before being stored in network cloud storage 118. In an alternative embodiment, the defragmentation operations of FIG. 3 may be performed by the backup application 108 before transmitting the volume objects $112_C$, $116_C$ to the cloud storage service 120. In a still further embodiment, the defragmentation operations of FIG. 3 may be performed by the backup application 108 for volume backup objects to store locally such as on client storage 104 to maintain volume backups for recovery operations.

The above described embodiments concern volume backup objects. In additional embodiments, the objects subject to backup by the backup application 108 may comprise data set backup objects. In data set backup object embodiments, in order to release unallocated space for a data set backup object, a determination is made by referring to metadata objects (i.e., VTOC and VVDS objects) for the data set object that resides within the backup. By reading the metadata objects, the determination can be made where allocated but unused space exists for the data set. The extents in the data object could then be read and stored at consecutive bytes up to where the used space ends as represented by the metadata in the temporary data set object. The temporary data set objects being created defragmented may then be renamed as described with respect to FIG. 3.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
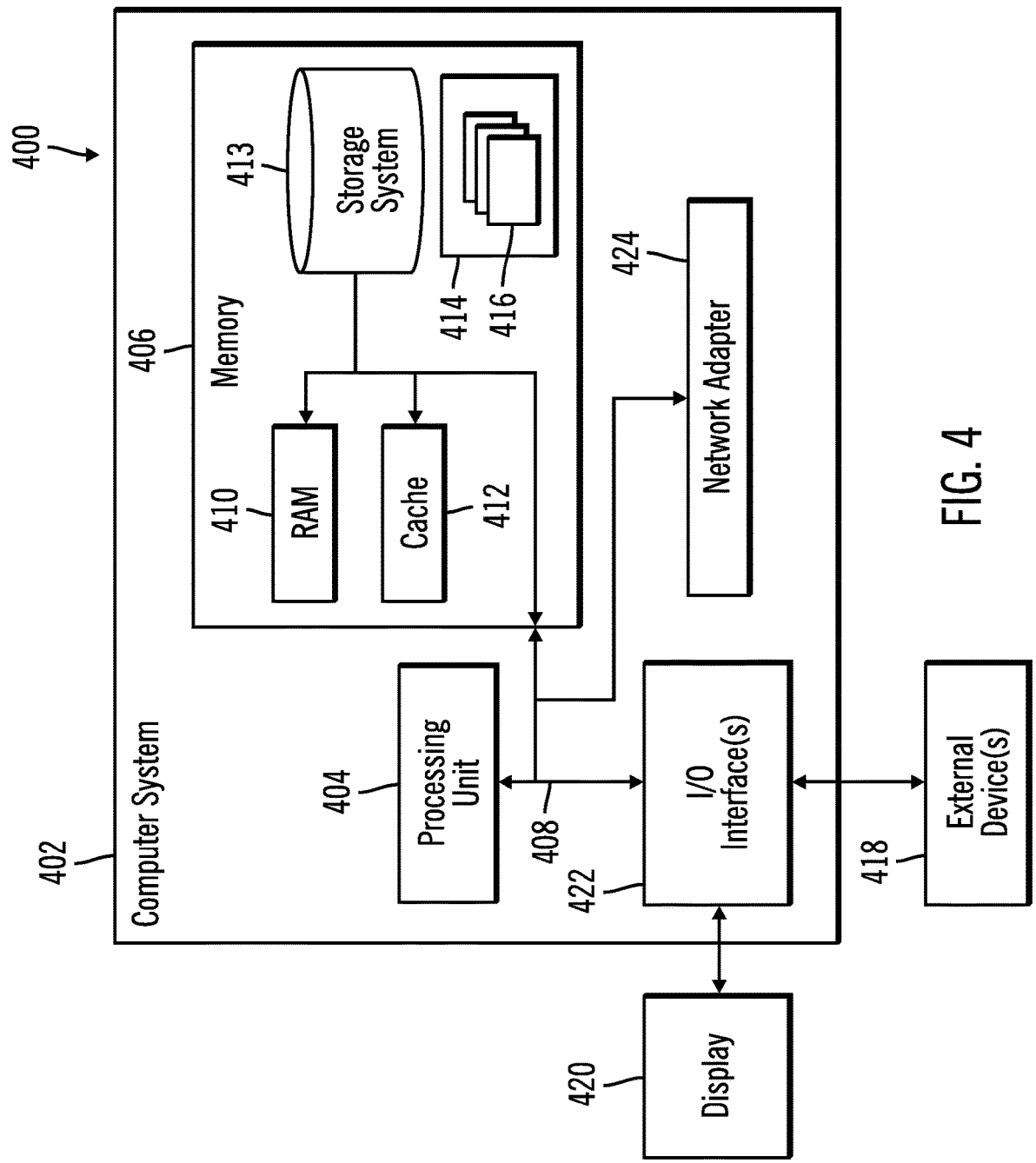
FIG. 4 depicts an embodiment of a cloud computing node.

Referring now to FIG. 4, a schematic of an example of a cloud computing node is shown, such as the client systems 100 and storage server 122, that implement a cloud based storage service. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 20. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Figure 5:
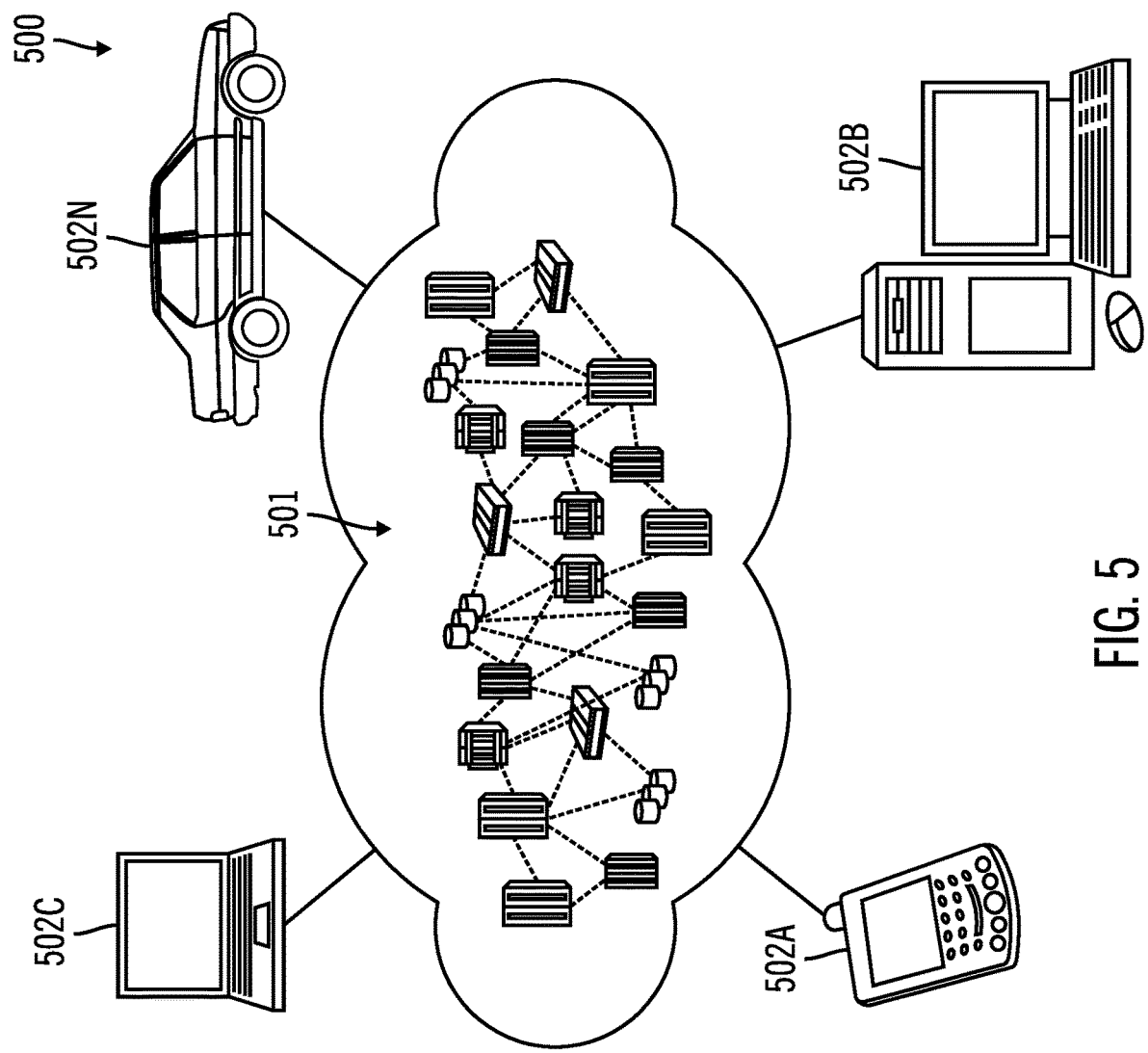
FIG. 5 depicts an embodiment of a cloud computing environment.

Referring now to FIG. 5, illustrative cloud computing environment 500 is depicted. As shown, cloud computing environment 500 comprises one or more cloud computing nodes 501 with which local computing devices used by cloud consumers, such as, for example, personal digital assistant (PDA) or cellular telephone 502A, desktop computer 502B, laptop computer 502C, and/or automobile computer system 502N may communicate. Nodes 501 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device, such as the case with the cloud storage service 120 of FIG. 1. It is understood that the types of computing devices 502A-N shown in FIG. 5 are intended to be illustrative only and that computing nodes 501 and cloud computing environment 500 can communicate with any type of computerized device over any type of network and/or network addressable connection (e.g., using a web browser).

Figure 6:
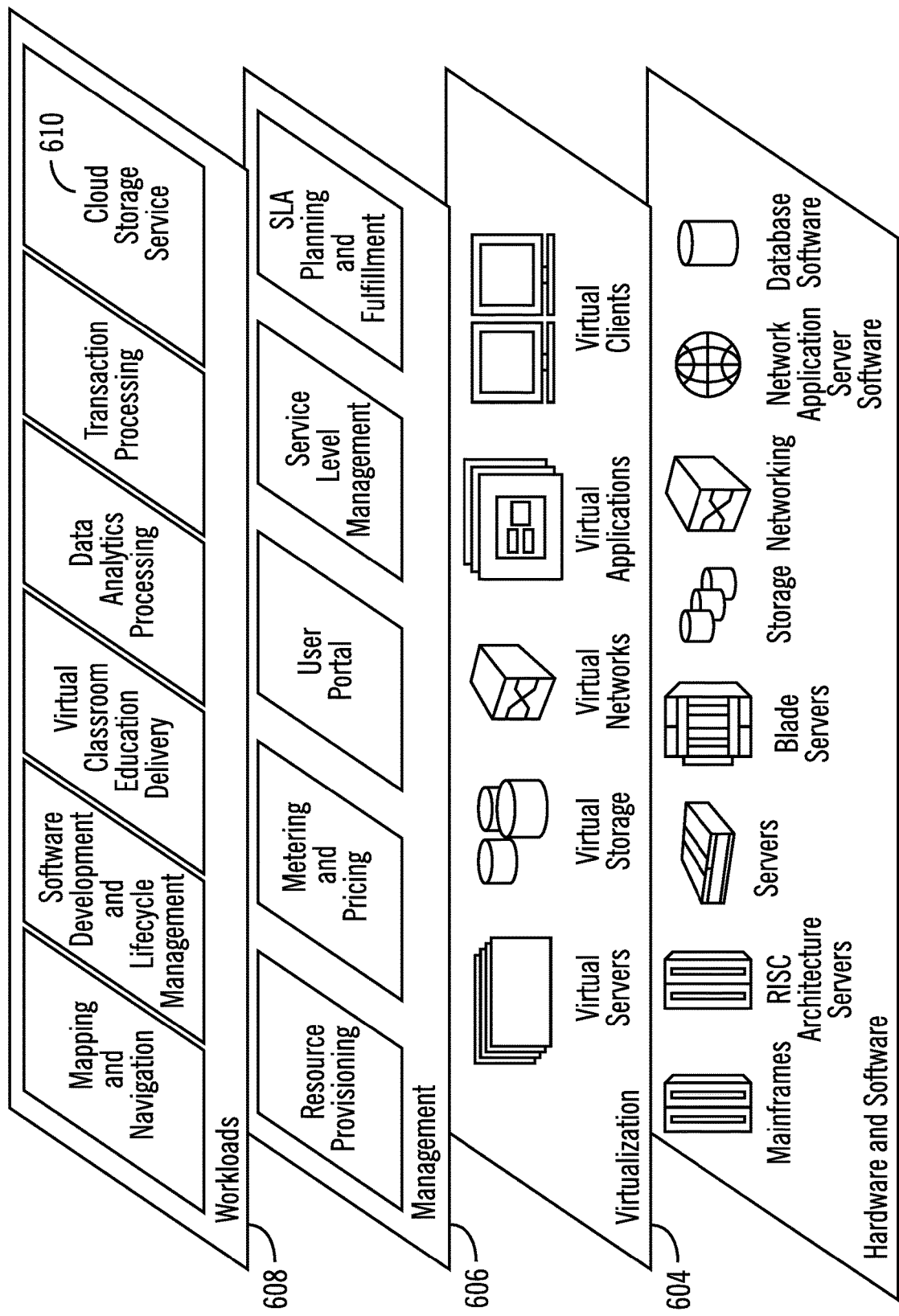
FIG. 6 depicts an embodiment of abstraction model layers of a cloud computing environment.

Referring now to FIG. 6, a set of functional abstraction layers provided by cloud computing environment 600 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes; RISC (Reduced Instruction Set Computer) architecture based servers; storage devices; networks and networking components. In some embodiments, software components include network application server software.

Virtualization layer 604 provides an abstraction layer from which the following examples of virtual entities may be provided: virtual servers; virtual storage; virtual networks, including virtual private networks; virtual applications and operating systems; and virtual clients.

In one example, management layer 606 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 608 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud based storage services 610 as described above with respect to the cloud storage service 120 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, j, k, m are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for defragmenting backup objects to store in a storage, wherein the computer program product comprises a computer readable storage medium having computer readable program instructions executed by a processor to perform operations, the operations comprising:
    copying a metadata object having first format addresses for data sets in data objects for a volume to a temporary metadata object;
    copying the data sets in the data objects to consecutive second format addresses in temporary data objects to defragment data in the data sets in the data objects, wherein the first format and the second format addresses comprise different address formats; and
    storing the temporary metadata object and the temporary data objects in the storage to provide a backup of the volume.

2. The computer program product of claim 1, wherein the metadata object comprises a volume table and the temporary metadata object comprises a temporary volume table.

3. The computer program product of claim 1, wherein the first format addresses comprise track format addresses and wherein the second format addresses comprise relative byte address in a storage device in which the temporary data objects are stored.

4. The computer program product of claim 1, wherein the operations further comprise:
    renaming the metadata object and the data objects from original names to temporary names; and
    renaming the temporary metadata object and the temporary data objects to the original names that were used for the metadata object and the data objects, respectively.

5. The computer program product of claim 1, wherein the operations further comprise:
    determining a new first format address mapping to a second format address of data in a data set in a temporary data object of the temporary data objects, wherein the new first format address is different from a first format address for the data in the temporary metadata object; and
    updating the temporary metadata object to include the new first format address for the data in the temporary metadata object.

6. The computer program product of claim 5, wherein the determining the new first format address is performed for data in each of the data sets in the data objects, wherein the operations for comprise:
    determining whether a determined new first format address for data matches the first format address for the data in the temporary metadata object, wherein the updating the temporary metadata object to include the determined new first format address is performed in response to determining that the new first format address does not match the first format address for the data in the temporary metadata object.

7. The computer program product of claim 6, wherein the data for which first format addresses are indicated in the metadata object comprises extents of data, wherein each data set has at least one extent, and wherein the determining the new first format address, the determining whether the determined new first format address matches the first format address in the temporary metadata object, and the updating the temporary metadata object to include the new first format address are performed for each of the extents in the data sets in the data objects.

8. The computer program product of claim 1, wherein the temporary metadata object is written to a second format address in a metadata object that maps to a first format address in the metadata object, and wherein data from at least one data set is written to a second format address that does not map to the first format address in the temporary metadata object.

9. The computer program product of claim 1, wherein the metadata object comprises a volume table, wherein the metadata object and data set objects are received in volume backup objects from a client system over a network, and wherein the temporary metadata object and defragmented data sets in the temporary data objects are stored in a network storage as part of a network storage service.

10. The computer program product of claim 1, wherein the first format addresses in the metadata object remain unchanged for data written to consecutive second format addresses in the temporary data objects that do not map to the first format addresses in the metadata object for the data to cause the data in the data objects written to consecutive locations in the temporary data objects to be restored to non-consecutive first format addresses in the metadata object.

11. A system for defragmenting backup objects to store in a storage, comprising:
    a processor; and
    a computer readable storage medium having computer readable program instructions executed by the processor to perform operations, the operations comprising:
        copying a metadata object having first format addresses for data sets in data objects for a volume to a temporary metadata object;
        copying the data sets in the data objects to consecutive second format addresses in temporary data objects to defragment data in the data sets in the data objects, wherein the first format and the second format addresses comprise different address formats; and
        storing the temporary metadata object and the temporary data objects in the storage to provide a backup of the volume.

12. The system of claim 11, wherein the first format addresses comprise track format addresses and wherein the second format addresses comprise relative byte address in a storage device in which the temporary data objects are stored.

13. The system of claim 11, wherein the operations further comprise:
   renaming the metadata object and the data objects from original names to temporary names; and
   renaming the temporary metadata object and the temporary data objects to the original names that were used for the metadata object and the data objects, respectively.

14. The system of claim 11, wherein the operations further comprise:
   determining a new first format address mapping to a second format address of data in a data set in a temporary data object of the temporary data objects, wherein the new first format address is different from a first format address for the data in the temporary metadata object; and
   updating the temporary metadata object to include the new first format address for the data in the temporary metadata object.

15. The system of claim 14, wherein the determining the new first format address is performed for data in each of the data sets in the data objects, wherein the operations for comprise:
   determining whether a determined new first format address for data matches the first format address for the data in the temporary metadata object, wherein the updating the temporary metadata object to include the determined new first format address is performed in response to determining that the new first format address does not match the first format address for the data in the temporary metadata object.

16. A method for defragmenting backup objects to store in a storage, comprising:
   copying a metadata object having first format addresses for data sets in data objects for a volume to a temporary metadata object;
   copying the data sets in the data objects to consecutive second format addresses in temporary data objects to defragment data in the data sets in the data objects, wherein the first format and the second format addresses comprise different address formats; and
   storing the temporary metadata object and the temporary data objects in the storage to provide a backup of the volume.

17. The method of claim 16, wherein the first format addresses comprise track format addresses and wherein the second format addresses comprise relative byte address in a storage device in which the temporary data objects are stored.

18. The method of claim 16, further comprising:
   renaming the metadata object and the data objects from original names to temporary names; and
   renaming the temporary metadata object and the temporary data objects to the original names that were used for the metadata object and the data objects, respectively.

19. The method of claim 16, further comprising:
   determining a new first format address mapping to a second format address of data in a data set in a temporary data object of the temporary data objects, wherein the new first format address is different from a first format address for the data in the temporary metadata object; and
   updating the temporary metadata object to include the new first format address for the data in the temporary metadata object.

20. The method of claim 19, wherein the determining the new first format address is performed for data in each of the data sets in the data objects, further comprising:
   determining whether a determined new first format address for data matches the first format address for the data in the temporary metadata object, wherein the updating the temporary metadata object to include the determined new first format address is performed in response to determining that the new first format address does not match the first format address for the data in the temporary metadata object.

* * * * *